W. A. N. LONG & G. H. COATES.
Fire-Kindlers.

No. 151,707. Patented June 9, 1874.

Witnesses.
S. N. Piper
L. N. Miller

William A. N. Long
and
George H. Coates
by their attorney
R. H. Eddy

UNITED STATES PATENT OFFICE.

WILLIAM A. N. LONG AND GEORGE H. COATES, OF WORCESTER, MASS.

IMPROVEMENT IN FIRE-KINDLERS.

Specification forming part of Letters Patent No. 151,707, dated June 9, 1874; application filed May 13, 1874.

*To all whom it may concern:*

Be it known that we, WILLIAM A. N. LONG and GEORGE H. COATES, of the city and county of Worcester and State of Massachusetts, have invented a new and useful or Improved Fire-Kindler; and we do hereby declare the same to be fully described in the following specification and represented in the accompanying drawings, of which—

Figure 1:
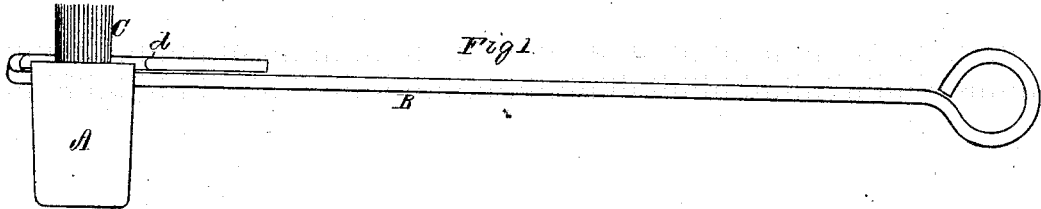
Figure 2:
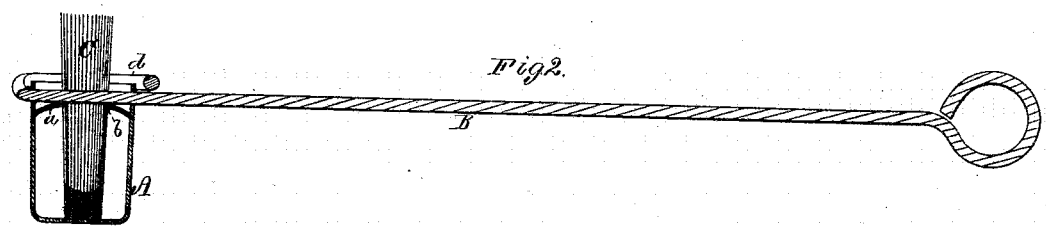

Figure 1 is a side elevation, and Fig. 2 a longitudinal section, of our said fire-kindler.

Figure 3:
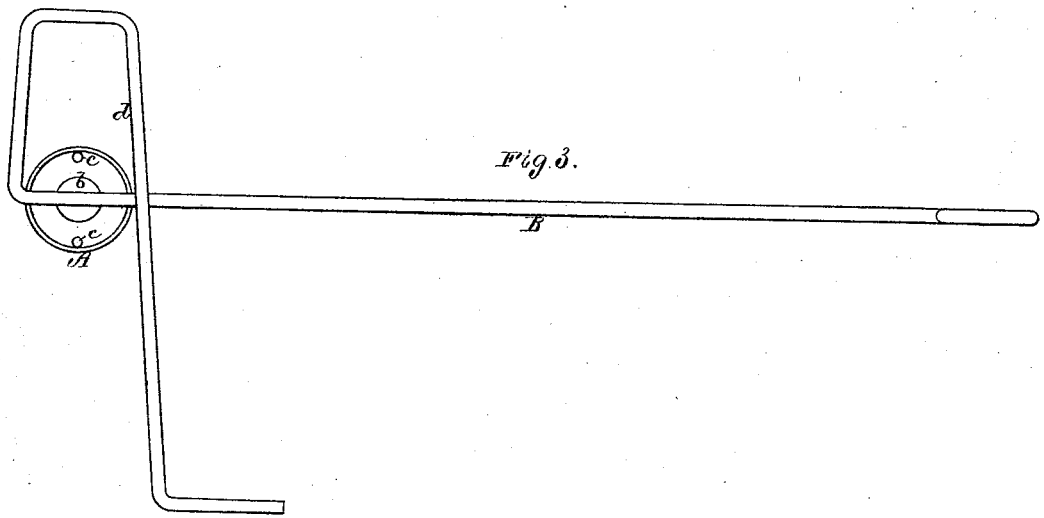

In carrying out our invention we make use of a thimble or reservoir, A, for holding kerosene or other readily-vaporizable hydrocarbon liquid, such reservoir being open at top. Across the reservoir, and a short distance below the upper edge thereof, we arrange a disk, $a$, having a round hole, $b$, in it concentrically, and also one or more holes, $c$, besides, the same being as shown in Fig. 3, which is a top view of the reservoir. Into the hole $b$ and the reservoir we insert a bunch or mass, C, of wires, as bristles are usually placed in a brush-block, and we extend such mass above the reservoir in manner as shown, the portions of the wires so extending above the disk being deflected or spread laterally, as represented. We also extend a handle or wire, B, directly through the reservoir and mass C of wires, and above the disk, and next bend the wire down around the reservoir and upward above such, and hook or bend the wire at, or about at, a right angle, near its upper end, all as represented. The other end of the wire may be bent around in the form of a ring.

That part $d$ of the wire which projects above the reservoir we term the hooked arm, its purpose being to support the kindler on one of the bars of a grate while the kindler may be in use.

The operation of the kindler may be thus described: On its reservoir being charged with the vaporizable hydrocarbon, and the mass of wires being wet with it and inflamed, heat from the flame will be conducted by the wires down into the liquid in the reservoir, and will vaporize it. The vapor will rise up into the mass of wires, and in turn be inflamed. Furthermore, the portions of the wires within the reservoir and below the disk will elevate the liquid by capillary attraction.

By extending the handle-wire through the reservoir and the mass of wires, it not only serves to aid in holding the wires in place, but to spread and keep them spread apart.

A fire-kindler so made, besides being highly efficient in use, is very durable, for the wires will maintain their normal condition, with little or no danger of injury from the flame.

We claim—

The combination of the reservoir A, heat-conductor or mass of wires C, perforated disk $a$, and the handle B, provided with the hooked arm $d$, all arranged substantially as shown and described.

WILLIAM A. N. LONG.
GEORGE H. COATES.

Witnesses:
W. E. MILLS,
F. H. MILLS.